(12) United States Patent
Gruteser et al.

(10) Patent No.: US 11,727,255 B2
(45) Date of Patent: Aug. 15, 2023

(54) SYSTEMS AND METHODS FOR EDGE ASSISTED REAL-TIME OBJECT DETECTION FOR MOBILE AUGMENTED REALITY

(71) Applicant: Rutgers, The State University of New Jersey, New Brunswick, NJ (US)

(72) Inventors: Marco Gruteser, Princeton, NJ (US); Luyang Liu, Redmond, WA (US); Hongyu Li, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 63 days.

(21) Appl. No.: 17/071,171

(22) Filed: Oct. 15, 2020

(65) Prior Publication Data
US 2021/0110191 A1    Apr. 15, 2021

Related U.S. Application Data

(60) Provisional application No. 62/915,286, filed on Oct. 15, 2019.

(51) Int. Cl.
| | |
|---|---|
| *G06N 3/00* | (2023.01) |
| *G06N 3/063* | (2023.01) |
| *G06N 3/08* | (2023.01) |
| *G06V 10/25* | (2022.01) |
| *G06V 20/20* | (2022.01) |
| *G06V 10/764* | (2022.01) |

(Continued)

(52) U.S. Cl.
CPC .............. *G06N 3/063* (2013.01); *G06N 3/08* (2013.01); *G06V 10/25* (2022.01); *G06V 10/764* (2022.01); *G06V 10/82* (2022.01); *G06V 20/20* (2022.01); *G06V 20/40* (2022.01)

(58) Field of Classification Search
CPC ...... G06V 10/25; G06V 20/20; G06V 10/764; G06V 10/82; G06V 20/40; G06N 3/08; G06N 3/063; G06N 3/0454
See application file for complete search history.

(56) References Cited

U.S. PATENT DOCUMENTS

| | | | |
|---|---|---|---|
| 2015/0081675 A1 | 3/2015 | Huang | |
| 2019/0197339 A1* | 6/2019 | Han | ........................ G06F 9/50 |
| 2021/0407103 A1* | 12/2021 | Tang | ..................... G06V 20/40 |

OTHER PUBLICATIONS

Elkoubaiti et al, How Are Augmented and Virtual Reality Used in Smart Classrooms?, ICSDE '18, Oct. 18-20, 2018.*

(Continued)

*Primary Examiner* — Nancy Bitar
*Assistant Examiner* — Xiao Liu
(74) *Attorney, Agent, or Firm* — McCarter & English, LLP

(57) ABSTRACT

Systems and methods for edge assisted real-time object detection for mobile augmented reality are provided. The system employs a low latency offloading process, decouples the rendering pipeline from the offloading pipeline, and uses a fast object tracking method to maintain detection accuracy. The system can operate on a mobile device, such as an AR device, and dynamically offloads computationally-intensive object detection functions to an edge cloud device using an adaptive offloading process. The system also includes dynamic RoI encoding and motion vector-based object tracking processes that operate in a tracking and rendering pipeline executing on the AR device.

23 Claims, 15 Drawing Sheets

(51) Int. Cl.
    *G06V 10/82*     (2022.01)
    *G06V 20/40*     (2022.01)

(56) References Cited

OTHER PUBLICATIONS

Jung et al, Efficient mobile AR technology using scalable recognition and tracking based on server-client model, Computers & Graphics 36, pp. 131-139 (Year: 2012).*

Misra et al, An overview of tiles in HEVC, Journal of Selected Topics in Signal Processing, 7(6), pp. 969-977 (Year: 2013).*

Haynes et al, LightDB: A DBMS for Virtual Reality Video, Proc. of the VLDB Endowment, vol. 11, No. 10 (Year: 2018).*

Girshick, "Fast R-CNN", arXiv:1504.08083v2 (Year: 2015).*

Ran et al, DeepDecision: A Mobile Deep Learning Framework for Edge Video Analytics, IEEE INFOCOM 2018—IEEE Conference on Computer Communications, pp. 1421-1429 (Year: 2018).*

Chen et al, Glimpse: Continuous, Real-Time Object Recognition on Mobile Devices, SenSys'15, Nov. 1-4, pp. 155-168 (Year: 2015).*

Graf et al, Towards Bandwidth Efficient Adaptive Streaming of Omnidirectional Video over HTTP, MMSys'17, pp. 261-271 (Year: 2017).*

Jain, et al., "Low Bandwidth Offload for Mobile AR," CoNEXT '16: Proceedings of the 12th International on Conference on Emerging Networking Experiments and Technologies, Dec. 2016 (15 pages).

Liu, et al., "Edge Assisted Real-Time Object Detection for Mobile Augmented Reality," MobiCom '19: The 25th Annual International Conference on Mobile Computing and Networking, Aug. 2019 (16 pages).

Qiu, et al., "AVR: Augmented Vehicular Reality," MobiSys '18: Proceedings of the 16th Annual International Conference on Mobile Systems, Applications, and Services, Jun. 2018 (15 pages).

\* cited by examiner

SYSTEMS AND METHODS FOR EDGE ASSISTED REAL-TIME OBJECT DETECTION FOR MOBILE AUGMENTED REALITY

RELATED APPLICATIONS

This application claims the priority of U.S. Provisional Application Ser. No. 62/915,286 filed Oct. 15, 2019, the entire disclosure of which is expressly incorporated herein by reference.

STATEMENT OF GOVERNMENT INTERESTS

This invention was made with government support under Grant Number 1329939 awarded by the National Science Foundation. The government has certain rights in the invention.

BACKGROUND

Technical Field

The present disclosure relates generally to the field of computer-based augmented reality (AR) and mixed-reality (MR) systems. More specifically, the present disclosure relates to systems and methods for edge assisted real-time object detection for mobile augmented reality.

Related Art

Most existing Augmented Reality (AR) and Mixed Reality (MR) systems are able to understand the 3D geometry of the surroundings, but they often lack the ability to detect and classify complex objects in the real world. Such capabilities can be enabled with deep Convolutional Neural Networks (CNN), but it remains difficult to execute large networks on mobile devices. Offloading object detection to the edge or cloud is also very challenging due to the stringent requirements on high detection accuracy and low end-to-end latency. The long latency of existing offloading process can significantly reduce the detection accuracy due to changes in the user's view.

The ability to detect and classify complex objects in the real world is very important, and indeed, is essential for many new AR and MR applications. High quality AR devices require the system to not only successfully classify the object, but also localize the object with high accuracy. Even detection latencies of less than 100 ms can therefore significantly reduce the detection accuracy due to changes in the user's view—the frame locations where the object was originally detected may no longer match the current location of the object.

Accordingly, the systems and methods of the present disclosure address the foregoing (and other) needs by providing edge assisted real-time object detection for mobile augmented reality.

SUMMARY

The present disclosure relates to systems and methods for edge assisted real-time object detection for mobile augmented reality. The system employs a low latency offloading process, decouples the rendering pipeline from the offloading pipeline, and uses a fast object tracking method to maintain detection accuracy. The system operates on a mobile device, such as an AR device, and dynamically offloads computationally-intensive object detection functions to an edge cloud device using an adaptive offloading process. The system also includes dynamic RoI encoding and motion vector-based object tracking processes that operate in a tracking and rendering pipeline executing on the AR device.

BRIEF DESCRIPTION OF THE DRAWINGS

The features of the present disclosure will be apparent from the following Detailed Description, taken in connection with the accompanying drawings, in which.

DETAILED DESCRIPTION

Figure 1:
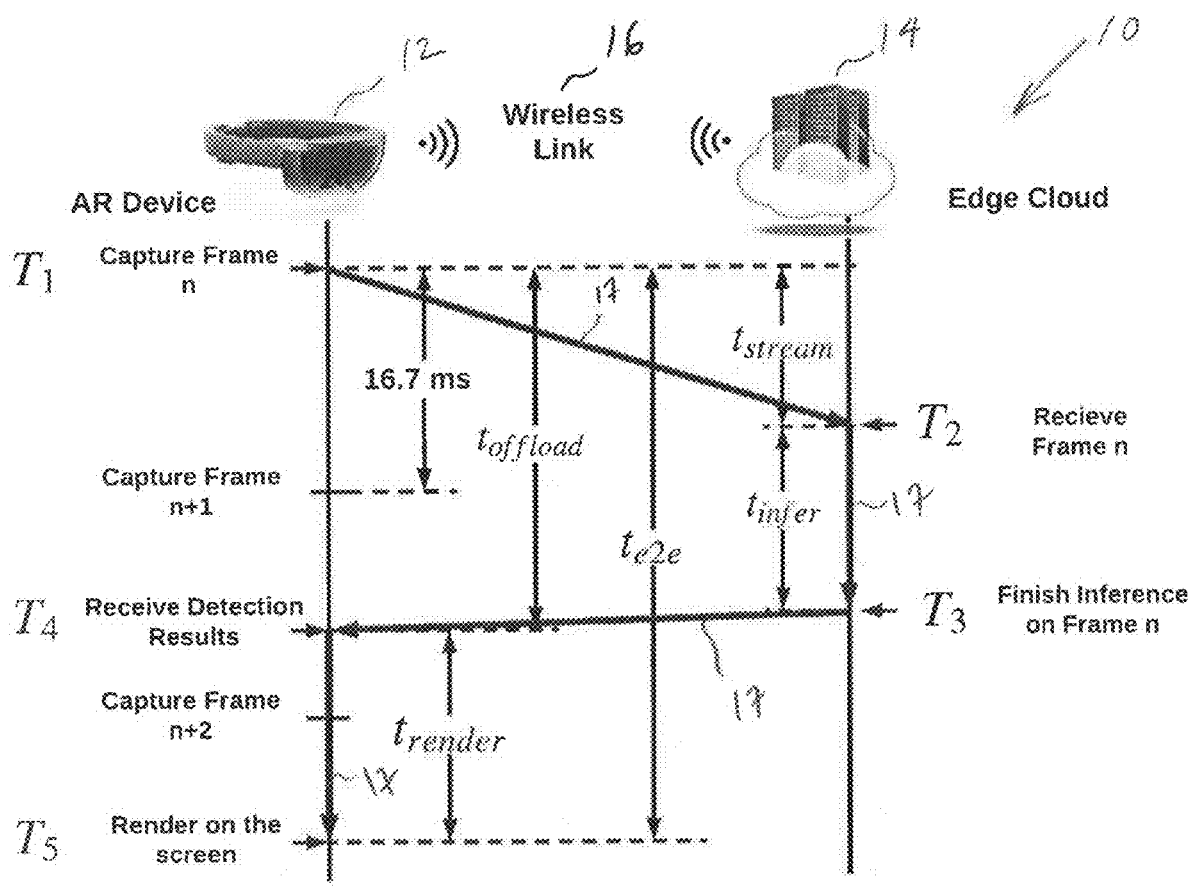
FIG. 1 is a diagram illustrating the system of the present disclosure.

The present disclosure relates to systems and methods for edge assisted real-time object detection for mobile augmented reality. The system provides high accuracy object detection for commodity AR/MR system running at 60 fps. The system employs low latency offloading process, decouples the rendering pipeline from the offloading pipeline, and uses a fast object tracking method to maintain detection accuracy. The result shows that the system can improve the detection accuracy by 20.2%-34.8% for the object detection and human keypoint detection tasks, and only requires 2.24 ms latency for object tracking on the AR device. Thus, the system leaves more time and computational resources to render virtual elements for the next frame and enables higher quality AR/MR experiences.

Potential applications and/or uses of the invention, commercial products, or services a company could develop using this technology, include retail, field service, design (e.g. of physical spaces), training, and education. The system includes significantly reduced offloading detection latency, as well as the ability to hide the remaining latency with an on-device fast object tracking method. Still further, the system results in a reduction in local processing on a device (phone, AR headset), as well as quantifying accuracy and latency requirements in an end-to-end AR system with the object detection task offloaded. Such a reduction in processing requirements also results in an increase in energy savings for the device, including increased battery life and less heat dissipation. The system provides a framework with individual rendering and offloading pipelines, as well as a dynamic region of interest ("RoI") encoding process to dynamically determine the regions of interest in order to reduce the transmission latency and bandwidth consumption in the offloading pipeline.

The system further provides a parallel streaming and inference method to pipeline the streaming and inference processes to further reduce the offloading latency. The system creates a Motion Vector Based Object Tracking (MvOT) process to achieve fast and lightweight object tracking on the AR devices, based on the embedded motion vectors in the encoded video stream. The system is an end-to-end system based on commodity hardware, and can achieve 60 fps AR experience with accurate object detection.

Potential product(s), commercial application(s), and the applicable market/industry of the invention include, but are not limited to:

Field Service (e.g. HVAC, of Industrial Equipment, other)—automatically detect device/parts and display service information, videos, as overlay via phone app.

Surgery—via specialized glasses provide information to surgeon as surgery progresses.

Detecting human body key points and facial landmarks allow rendering virtual overlays on the human body, Automotive—automatic detection of detecting surrounding vehicles or pedestrians can help warn a driver when facing potentially dangerous situations.

Remote Assistance—Help a worker perform their work.

Industrial Control Machines—Servicing/using

Military

Additionally, the following advantages are provided by the systems and methods disclosed herein:

Significantly reduced offloading detection latency

Hiding the remaining latency with an on-device fast object tracking method.

Reduction in local processing on device (phone, AR headset), which can allow for longer battery lifetimes and lower heat dissipation, among other benefits.

Quantifying accuracy and latency requirements in an end-to-end AR system with the object detection task offloaded.

A framework with individual rendering and offloading pipelines.

Dynamic RoI Encoding process to dynamically determine the Regions of Interest in order to reduce the transmission latency and bandwidth consumption in the offloading pipeline.

Parallel Streaming and Inference method to pipeline the streaming and inference processes to further reduce the offloading latency.

Motion Vector Based Object Tracking process to achieve fast and lightweight object tracking on the AR devices, based on the embedded motion vectors in the encoded video stream.

An end-to-end system based on commodity hardware that can achieve 60 fps AR experience with accurate object detection.

To reduce offloading latency, the system employs a dynamic RoI encoding process and a parallel streaming and inference process. The dynamic RoI encoding process adjusts the encoding quality on each frame to reduce the transmission latency based on the RoIs detected in the last offloaded frame. Regions with potential objects of interest are identified from candidate regions on prior frames. Higher-quality encodings are used in areas where objects are likely to be detected and stronger compression is used in other areas to save bandwidth and thereby reduce latency. The parallel streaming and inference method pipelines the streaming and inference processes to further reduce the offloading latency. A dependency-aware inference method enables slice-based inference of CNN object detection models without affecting the detection result. On the AR device, the system decouples the rendering pipeline from the offloading pipeline instead of waiting for the detection result from the edge cloud for every frame. To allow this, it uses a fast and lightweight object tracking method based on the motion vector extracted from the encoded video frames and the cached object detection results from prior frames processed in the edge cloud to adjust the bounding boxes or key points on the current frame in the presence of motion. Taking advantage of the low offloading latency, the method can provide accurate object detection results and leave enough time and computation resources for the AR device to render high-quality virtual overlays. An adaptive offloading process reduces the bandwidth and power consumption of the system by deciding whether to offload each frame to the edge cloud to process based on the changes of the frame compared to the previous offloaded frame.

The system achieves high accuracy object detection for existing AR/MR systems running at 60 fps for both the object detection and human keypoint detection task. An end-to-end AR platform is implemented on commodity devices to evaluate the system. The results show that the system increases the detection accuracy (by 20.2%-34.8%) and reduces the false detection rate (by 27.0%-38.2%) for the object detection and human keypoint detection tasks. Additionally, the system requires only 2.24 ms latency and less than 15% resources on the AR device, which leaves the remaining time between frames to render high quality virtual elements for high quality AR/MR experience.

FIG. 1 is a diagram illustrating the system of the present disclosure. The system includes an AR device 12 which communicates with one or more remote ("edge" or "cloud") computing systems 14 via a communications link 16, which could be a wireless network communications link (e.g., WiFi, Bluetooth, etc.). Also, the sequence of frame captures performed by the AR device 12, as well as the transmission to and processing of such frames by the edge cloud device 14, are also illustrated.

Referring to FIG. 1, the system provides the following benefits:

A framework with individual rendering and offloading pipelines;

A Dynamic RoI Encoding process to dynamically determine the Regions of Interest in order to reduce the transmission latency and bandwidth consumption in the offloading pipeline;

A Parallel Streaming and Inference method to pipeline the streaming and inference processes to further reduce the offloading latency;

A Motion Vector Based Object Tracking process to achieve fast and lightweight object tracking on the AR devices, based on the embedded motion vectors in the encoded video stream;

An end-to-end system based on commodity hardware that can achieve 60 fps AR experience with accurate object detection.

When offloading the detection tasks to more powerful edge or cloud platforms, the image encoding and transfer steps add significant latency. Longer latency not only reduces the detection accuracy but also degrades the AR experience. To better understand these challenges, the end-to-end latency of a baseline AR solution with offloading can be modeled as follows:

$$t_{e2e} = t_{offload} + t_{render}$$

$$t_{offload} = t_{stream} + t_{infer} + t_{trans\_back}$$

$$t_{stream} = t_{encode} + t_{trans} + decode \quad (1)$$

As shown in FIG. 1, the AR device 12 (i.e. smartphone or AR headset) is assumed to be connected to an edge cloud 14 through a wireless connection 16 (i.e. WiFi or LTE). The arrow 17 illustrates the critical path for a single frame. Let $t_{e2e}$ be the end-to-end latency, which includes the offloading latency $t_{offload}$ and the rendering latency $t_{render}$. $t_{off\_load}$ is determined by three main components: (1) the time to stream a frame captured by the camera from the AR device 12 to the edge cloud 14 ($t_{stream} = T_2 - T_1$), (2) the time to execute the object detection inference on the frame at the edge cloud 14 ($t_{infer} = T_3 - T_2$), and (3) the time to transmit the detection results back to the AR device 12 ($t_{trans\_back} = T_4 - T_3$). To reduce the bandwidth consumption and streaming latency $t_{stream}$, the raw frames are compressed to H.264 video streams on the device and decoded in the edge cloud. Therefore, $t_{stream}$ itself consists of encoding latency ($t_{encode}$), transmission latency ($t_{trans}$) and decoding latency ($t_{decode}$).

An experiment can be conducted measure the latency and its impact on detection accuracy in the entire pipeline, and find that it is extremely challenging for existing AR system to achieve high object detection accuracy in 60 fps display systems. In the experiment, a Nvidia Jetson TX2 is connected to an edge cloud through two different WiFi protocols (WiFi-5 GHz, WiFi-2.4 GHz) and stream encoded frames of a video at 1280×720 resolution from the Jetson to the edge cloud for inference. The edge cloud is a powerful PC equipped with a Nvidia Titan Xp GPU.

To evaluate the detection accuracy in terms of both object classification and localization, the IoU is calculated for each detected bounding box and its ground truth as the accuracy of this detection. The percentage of detected bounding boxes with less than 0.75 IoU (the strict detection metric used in the object detection task) is defined as false detection rate. The Object Keypoint Similarity (OKS) metric is used to measure the accuracy of each group of keypoints in the human keypoint detection task.

Figure 2A:
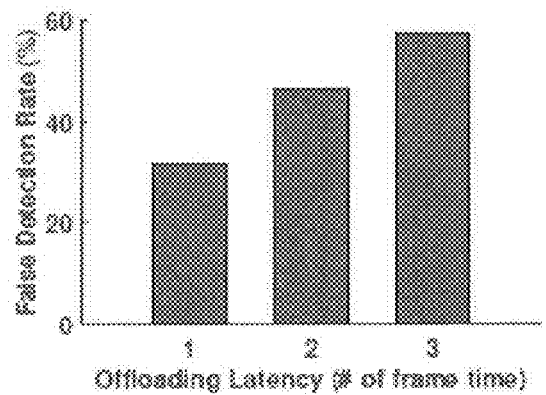
FIGS. 2A-2D are graphs illustrating latency and accuracy analyses of the system of the present disclosure.

Low latency object detection is highly beneficial for achieving a high detection accuracy. FIG. 2A shows the impact of $t_{offload}$ on the false detection rate. Even a latency of a frame time (16.7 ms) will increase the false detection rate from 0% to 31.56%. This is because during the time that the detection result is sent back to the AR device 12, the user's view may have changed due to user motion or scene motion.

Figure 2B:
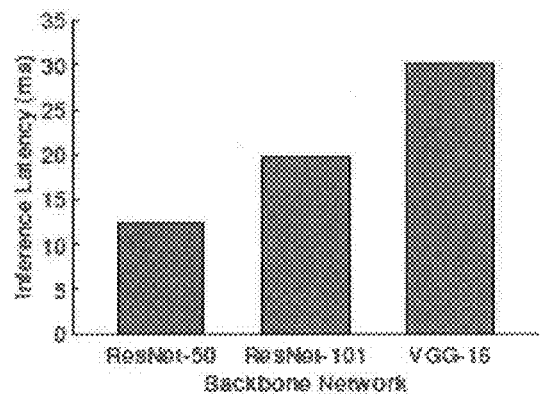

The latency spend is measured on inference ($t_{infer}$), and the result is shown in FIG. 2B. To push the limit of $t_{infer}$ on the edge cloud, TensorRT is used to optimize three pre-trained Faster R-CNN models[1] using INT8 precision. These three models use three different backbone CNN networks (ResNet-50, ResNet-101, and VGG-16) for feature extraction. As shown in FIG. 2B, it can be observed that all three models require more than 10 ms for object detection.

Figure 2C:
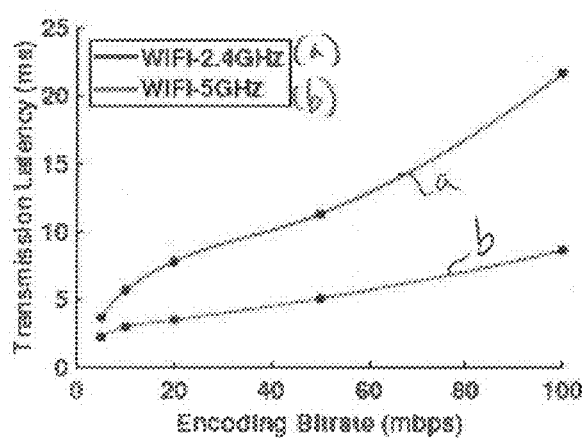

FIG. 2C shows the additional latency imposed by transmitting a single HD frame with different encoding bitrate from the AR device 12 to the edge cloud 14 ($t_{trans}$) through two different WiFi connections (WiFi-2.4 GHz and WiFi-5 GHz). Here, the bitrate is a codec parameter that determines the quality of video encoding. Encoding with small bitrate will result in a lossy frame after decoded. It can be observed that the average $t_{trans}$ requires to transmit an encoded frame with 50 mbps bitrate is 5.0 ms on 5 GHz WiFi and 11.2 ms on 2.4 GHz WiFi. Inference plus transmission latency therefore already exceeds the display time for one frame. One may think that decreasing resolution or encoding bitrate may reduce the transmission latency; however, this also reduces the detection accuracy of an object detection model.

[1] We choose Faster R-CNN because it is much more accurate than other alternatives, such as SSD and R-FCN.

Figure 2D:
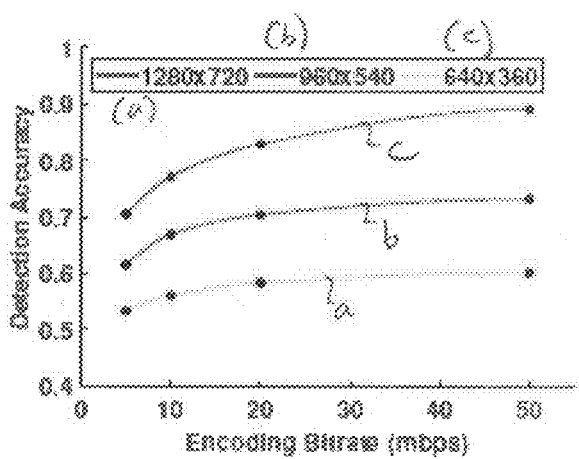

To validate this issue, the detection accuracy of the ResNet-50 based Faster R-CNN model is shown under different encoding bitrate and resolution in FIG. 2D. In this case, the detection result on raw video frames (without video compression) is used as the ground truth to calculate the IoU. The result shows that it requires at least 50 Mbps encoding bitrate to achieve a high detection accuracy (i.e. 90). The detection result is compared on two lower resolution frames (960×540 and 640×320), and show that lower resolution has much worse detection accuracy than the original 1280×720 frame. Lowering resolution therefore also does not improve detection accuracy. Note that this accuracy drop can be stacked together with the drop caused by the long offloading latency to get a much lower detection accuracy.

Based on the above analysis, it is extremely challenging for existing AR systems to achieve high object detection accuracy in 60 fps display systems. This can lead to poor alignment of complex rendered objects with physical objects or persons in the scene.

Figure 3:
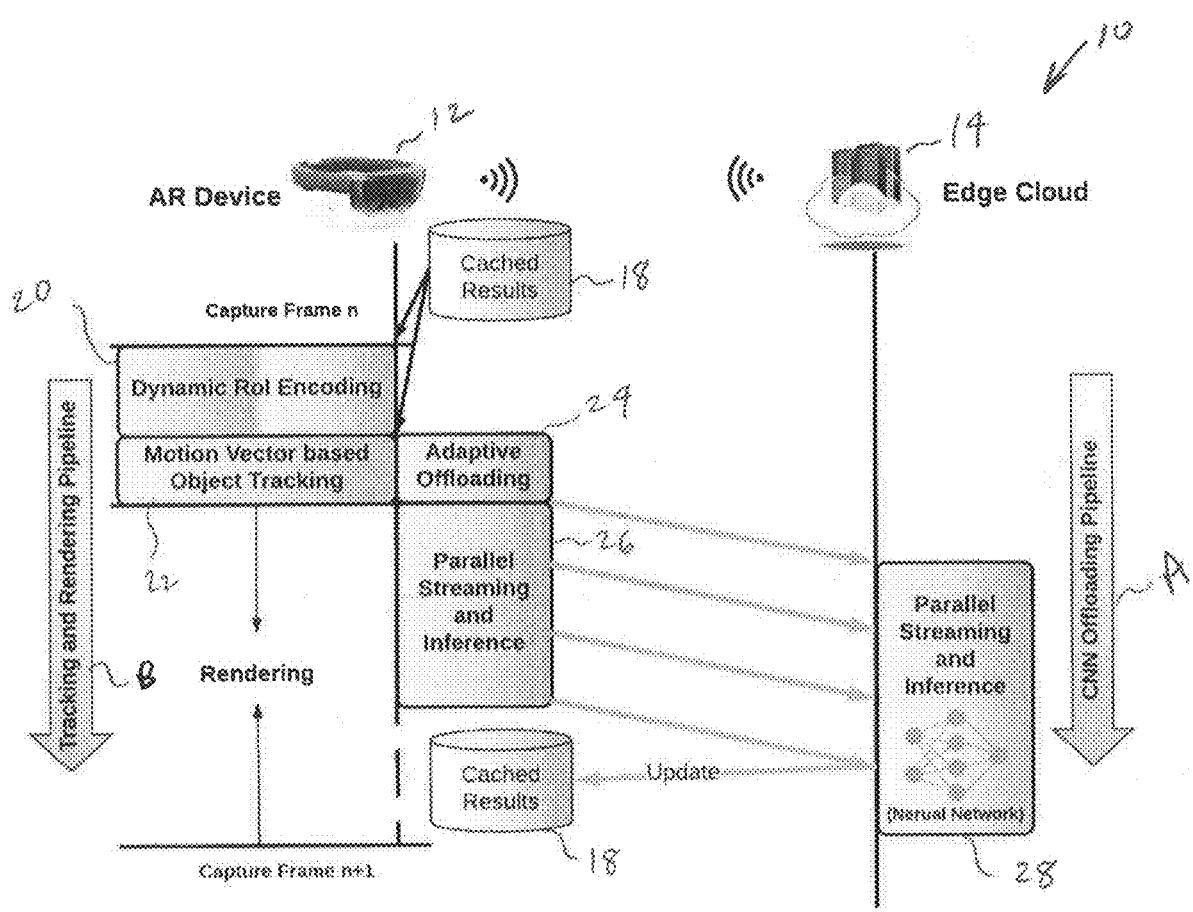
FIG. 3 is a diagram illustrating the overall architecture (hardware and software components) of the system of the present disclosure.

The system is able to achieve high accuracy object detection with little overhead on the rendering pipeline of mobile augmented reality platforms, by reducing the detection latency with low latency offloading process and hiding the remaining latency with an on-device fast object tracking method. FIG. 3 shows the architecture of the system 10. At a high level, the system has two parts connected through a wireless link: a local tracking and rendering system executing on a mobile device 12 (a smartphone or an AR headset) and a pipelined objected detection system executing on the edge cloud 14. To hide the latency caused by offloading the object detection task, the system 10 decouples the rendering process and the CNN offloading process into two separate pipelines. The local rendering pipeline starts to track the scene and render virtual overlays while waiting for object detection results, and then incorporates the detection results into the tracking for the next frame when they arrive.

As shown in FIG. 3, both pipelines start with a Dynamic RoI Encoding process 20 that not only compresses raw frames for the CNN offloading pipeline (arrow A), but also provides its meta data for the on-device tracking module in the tracking and rendering pipeline (arrow B). Dynamic RoI Encoding process 20 is an efficient video encoding mechanism that is able to largely reduce the bandwidth consumption and thereby reduce the transmission latency to the edge cloud 14, while maintaining detection accuracy. The key idea of Dynamic RoI Encoding (DRE) is to decrease the encoding quality of uninteresting areas in a frame and to maintain high quality for candidate areas that may contain objects of interest based on earlier object detection results. Due to the spatiotemporal correlation over subsequent video frames, the system uses the intermediate inference output of the last offloaded frame as candidate areas. These candidate areas are where it maintains high encoding quality and are also referred to as regions of interest (RoIs).

In the CNN offloading pipeline as illustrated by the shaded blocks and arrow, an Adaptive Offloading process 24 and a Parallel Streaming and Inference (PSI) process 26 is proposed to further reduce the latency and bandwidth consumption of the offloading task.

Adaptive Offloading process 24 is able to reduce the bandwidth and power consumption of the system by deciding whether to offload each frame to the edge cloud 14 based on whether there are significant changes compared to the previous offloaded frame. For efficiency, this process 24 reuses the macroblock type (inter-predicted blocks or intra-predicted blocks) embedded in the encoded video frame from the Dynamic RoI Encoding process 20 to identify significant changes that warrant offloading for object detection.

Once the frame is marked for offloading, the Parallel Streaming and Inference (PSI) process 26 parallelizes the transmission, decoding and inference tasks to further reduce the offloading latency. It splits a frame into slices and starts the convolutional neural network object detection process 28 on the edge cloud 14 as soon as a slice is received, rather than waiting for the entire frame. This means that reception, decoding, and object detection can proceed in parallel. To solve the dependency issues across slices during object detection, a Dependency Aware Inference mechanism is introduced that determines the region on each feature map that has enough input features to calculate after each slice is received, and only calculates features lie in this region. The detection results are sent back to the AR device 12 and cached for future use in a cache 18.

In the tracking and rendering pipeline (arrow B), instead of waiting for the next detection result, a fast and lightweight Motion Vector based Object Tracking (MvOT) process 22 is used to adjust the prior cached detection results with viewer or scene motion. Compared to traditional object tracking approaches that match image feature points (i.e. SIFT and Optical Flow) on two frames, this process 22 again reuses motion vectors embedded in the encoded video frames, which allows object tracking without any extra processing overhead. Given the aforementioned optimizations to reduce offloading latency, tracking is needed only for shorter time frames and a lightweight method can provide sufficiently accurate results. Using such a lightweight method leaves enough time and computational resources for rendering on the device, in particular to render high-quality virtual overlays within the 16.7 ms (for 60 Hz screen refresh rate) latency requirement.

The Dynamic RoI Encoding process 20 reduces the transmission latency of the offloading pipeline while maintaining a high object detection accuracy. Transmitting the frames with high visual quality from the mobile to the edge/cloud leads to a high bandwidth consumption and thereby transmission latency. Dynamic RoI Encoding process 20 selectively applies higher degrees of compression to parts of the frame that are less likely to contain objects of interest and maintains high quality in regions with candidate objects. This largely reduces the size of encoded frames with only a small tradeoff in object detection accuracy. The key lies in identifying the regions with potential objects of interest, are regions of interest. The design exploits candidate regions that have been generated internally by the convolutional neural network on prior frames. Note that Dynamic RoI Encoding process 20 leverages the existing RoI encoding process that is widely used in video streaming standards but adds a novel, effective mechanism to dynamically determine the RoIs for each frame.

It is noted that the processing steps performed by the edge cloud 14 need not be performed remotely from the AR device 12. For example, if the AR device 12 is connected to a local area network (or a wireless local area network), it is possible for a second computing system on such network to perform the processes of the edge cloud 14. Even further, it is possible that the approach discussed herein in connection with FIGS. 1 and 3 could be performed by a single computer having two separate processors (one processor being dedicated to the functions of the AR device 12, and a second (perhaps more powerful) processor being dedicated to the functions of the edge cloud 14).

While the building block of RoI encoding have been used in other applications, current methods to select regions of interest are not suitable for this augmented reality object detection task. RoI encoding is already supported by most video encoding platform, which allows the user to adjust the encoding quality (i.e. Quantization Parameter—QP) for each macroblock in a frame. It has been largely adopted in surveillance camera video streaming and 360-degree video streaming, where the RoIs are pre-defined or much easier to predict based on user's field of view. For example, the RoI can be derived as the area that a user chooses to look at. This region would then receive near-lossless compression to maintain quality while lossier compression is used for the background or non-RoI area. Augmented reality includes use cases that should draw users attention to other areas of the view and therefore regions of interest cannot just be based on the current objects a user focuses on.

Due to impressive performance gains, state-of-the-art object detection is largely based on CNN. While several networks exist (e.g., Faster-RCNN, Mask-RCNN), they share a similar architecture, which firstly utilizes a CNN network to extract the features of the input image, then internally propose candidate regions (also called regions of interest) and their corresponding possibilities through a region proposal network, and finally perform and refine the object classification. The CNN network is also called backbone network and there are multiple options for its implementation, including VGG, ResNet, and Inception. The region proposal network usually generates hundreds of regions of interest which are potential objects locations in the frame.

Note that the term RoIs is used both in object detection and video compression. For the object detection task, RoIs are usually the output proposals of the region proposal network. While in the field of video compression, RoIs are the areas inside video frames that may contain more visual information and will be encoded with fewer losses. This presents an opportunity to exploit this similarity and tie these concepts together.

Figure 4A:
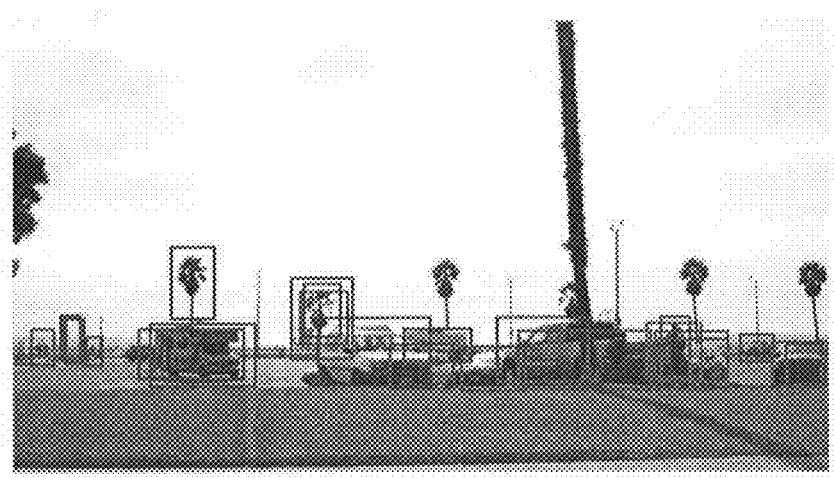
FIGS. 4A-4C are images illustrating three main procedures of RoI encoding performed by the system of the present disclosure.

In order to reduce the bandwidth consumption and data transmission delay, a dynamic RoI encoding mechanism is implemented in the system and links internal RoI generated in the object detection CNNs to the image encoder. Specifically, it uses the CNN candidate RoIs generated on the last processed frame for determining encoding quality on the next camera frame. It accommodates a degree of motion by slightly enlarging each region of interest by one macroblock but largely benefits from the similarity between two frames captured a short moment apart in time. While one may expect that even greater bandwidth savings are possible by choosing RoIs only in areas where object were detected on the previous frame, this approach frequently misses new objects that appear in the scene because the image areas containing these objects end up too heavily compressed. Changes in such a heavily compressed area, however, are often still identified as part of the much larger set of candidate RoIs of the CNN, the outputs of the region proposal network. The RoIs are used from the region proposal network, filtered with a low minimum prediction confidence threshold (i.e., 0.02). A sample output of the RoI detection method is shown in FIG. 4A.

Figure 4B:
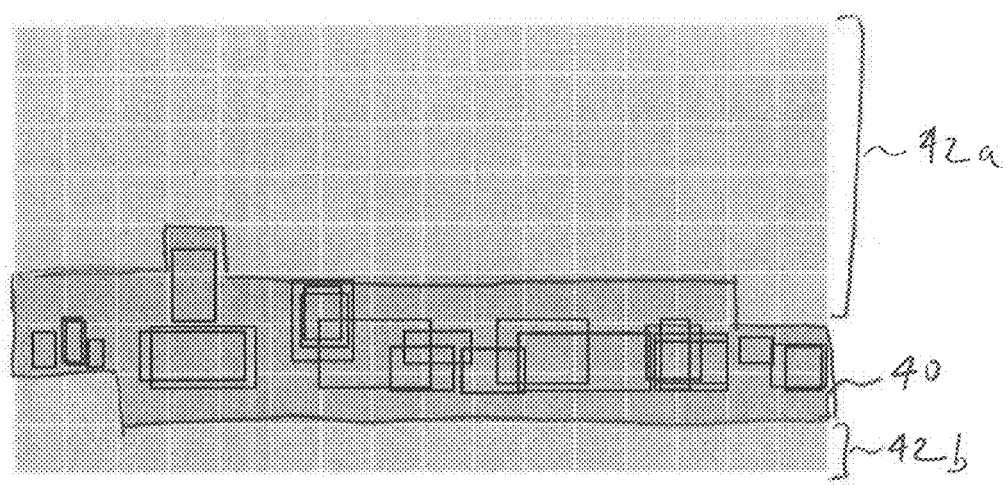
Figure 4C:
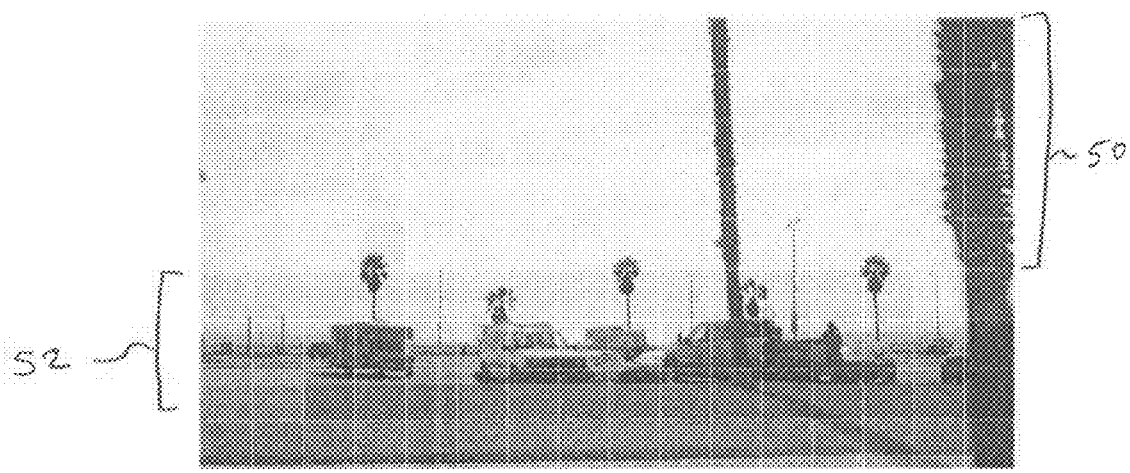

In order to use these selected RoIs to adjust the encoding quality on the current frame, a QP map is calculated that defines the encoding quality (QP) for each macroblock on the frame. The QP map indicates for each macroblock whether it overlaps with any RoI. In the example shown in FIG. 4B, all overlapping macroblocks are marked in region 40 and non-overlapping ones in regions 42a, 42b. Since object detection is offloaded to the edge, cloud the object detection pipeline sends this QP map back to the AR device, which uses it for the next captured frame. As shown in FIG. 4C, the encoder applies lossy compression on those non-overlapping regions 50, while maintaining high visual quality on overlapping regions 52. Note that FIGS. 4B and 4D use a grid of 16×9 macroblocks for illustration purposes. In the H.264 standard, a macroblock is usually 16×16 pixels, so a 1280×720 resolution frame has 80×45 macroblocks. Specifically, implementation reduces the QP value by 5 for lossy encoding.

The heavy deep neural network computation is offloaded to the edge cloud 14, as noted above. This requires transmitting the camera frames from the mobile side to the edge cloud. Conventional architectures, however, can only start the object detection process when the entire frame is received, as the deep neural networks are designed with neighborhood dependency. This will add to the latency, since both the streaming and the inference process take considerable time and run sequentially, as discussed herein. To mitigate this long latency, the Parallel Streaming and Inference process 26 enables inferences on slices of a frame, so that the streaming and inference can be effectively pipelined and executed in parallel. Since streaming and inference consume different resources that do not affect each other: transmission consumes bandwidth on the wireless link, decoding uses edge cloud hardware decoders, and the neural network inference mainly consumes GPUs or FPGAs resources on the edge cloud, this process effectively use multiple resources to execute different tasks in parallel, which can significantly reduce the latency.

Figure 5:
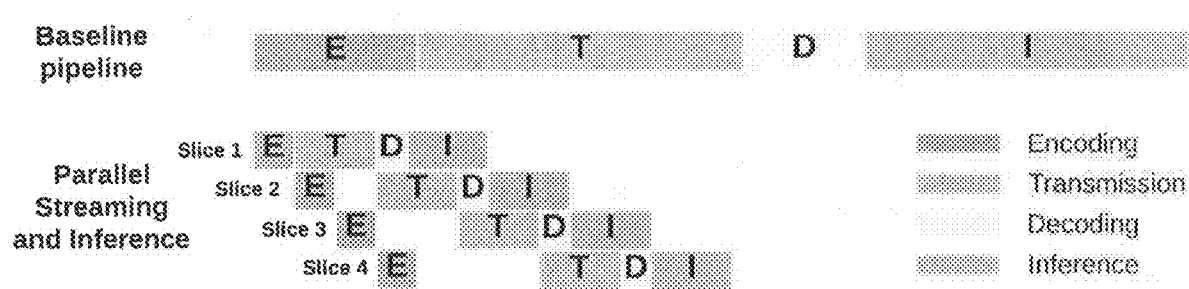
FIG. 5 is a diagram illustrating parallel streaming and interference attributes of the system of the present disclosure.

The challenge for deep neural networks to execute on a slice of frame is the dependency among inputs, which is caused by the neuron operations that take neighborhood values as input. To address this problem, Dependency Aware Inference automatically analyzes the dependencies of each layer, and only infer on the regions which have enough neighbor values. FIG. 5 shows how the Parallel Streaming and Inference method reduces the offloading latency. Compared with encoding and inference on the entire frame, the whole image is encoded into multiple slices, each slice will be sent to the edge cloud immediately after it is encoded. The edge cloud will start to infer once it receives and decodes the first slice of the frame.

Due to the computational dependency among neighbor values of the input frame, simply running inference and then merging based on slices of a frame will cause significant wrong feature values near boundaries. A Dependency Aware Inference process only calculates the regions of feature points in each layer with enough input feature points available. Dependencies are caused by the convolutional layers (as well as pooling layers sometimes), where the feature computation around the boundary of each frame slice requires also adjacent slices. This effect propagates for the standard convolutional layers and pooling layers structure. It was experimentally found that the boundary feature computation of the last convolutional layer on VGG-16, Resnet-50, and Resnet-101, requires 96, 120, 240 pixels respectively. One naive solution for parallelizing inference is to recompute such regions when the next slice arrives at the edge cloud. However, this requires significant extra computations for every convolutional layer, which inflates the inference latency.

To solve this dependency issue, the size of the valid region for the output feature map of each layer is calculated, and only infer based on valid regions. Valid regions are defined as the areas of each convolutional feature map that have enough input features available and their sizes can be determined in Equation 2:

$$H_i^{out} = (H_i^{in} - 1)/S + 1 \qquad (2)$$

$$W_i^{out} = \begin{cases} \dfrac{W_i^{in} - (F-1)/2 - 1}{S} + 1, & i = 1, 2, \ldots, n-1 \\ \dfrac{W_i^{in} - 1}{S} + 1, & i = n \end{cases}$$

$H_i^{out}$ and $W_i^{out}$ are the height and width of valid region of the output feature map of a convolutional layer after slice i arrives at the edge cloud (i is the number of slice, n is the number of slices that are divided). Similarly, $H_i^{in}$ and $W_i^{in}$ are the valid region on the input feature map of this convolutional layer. The spatial extent and stride of this cony layer are defined as F and S correspondingly. Assuming the number zero padding of a cony layer is equal to (F−1)/2 in most cases. n is empirically set to 4 in the system to archive a balance between transmission and inference.

Figure 6:
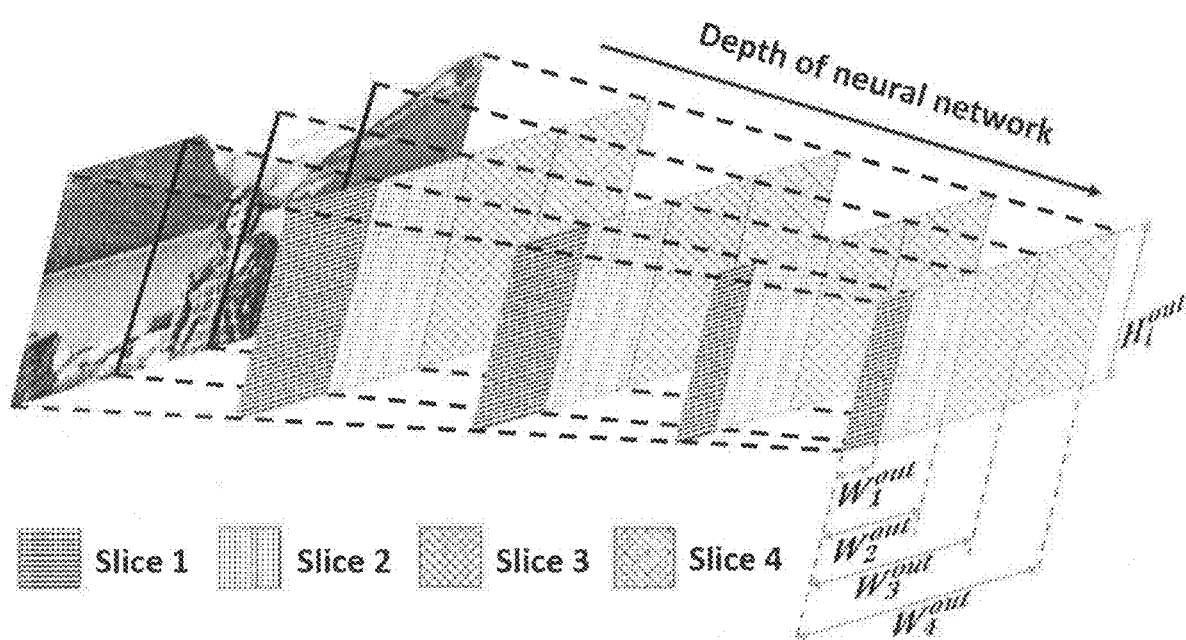
FIG. 6 is a diagram illustrating dependency-aware interference of the system of the present disclosure.

FIG. 6 illustrates the concept of the Dependency Aware Inference process. Since the system cuts the whole frame into 4 slices with ¼ of the original width, $H_i^{out}$ of one conv layer is constant and only affected by $H_i^{in}$ and S as shown in the first equation, while keeps increasing as more slices arrive at the edge cloud. For example, in the case of a standard 3×3 convolutional layer with stride 1, the system does not calculate the very right column of features for slice 1, 2 and 3, due to those features requiring inputs from the next slice of the frame. As shown in FIG. 6, the system only calculates the red regions in each cony layer after slice 1 arrives at the edge cloud. As more slices arrive, the valid region keeps increasing on each feature map, and the system continuously calculates those new features included in the valid region. It is observed that the number of features that can be calculated for slice 1 keeps decreasing as the network goes deeper. Slices 2 and 3 are able to compute more features than slice 1, and all the remaining features will be calculated after slice 4 arrives. A similar logic is defined to process pooling layers, which will not calculate the right-most column in the output feature map for slices 1, 2 and 3 if the input feature map is an odd number.

Figure 7A:
FIGS. 7A-7C are images illustrating the main procedures of RoI encoding performed by the system of the present disclosure.
Figure 7B:
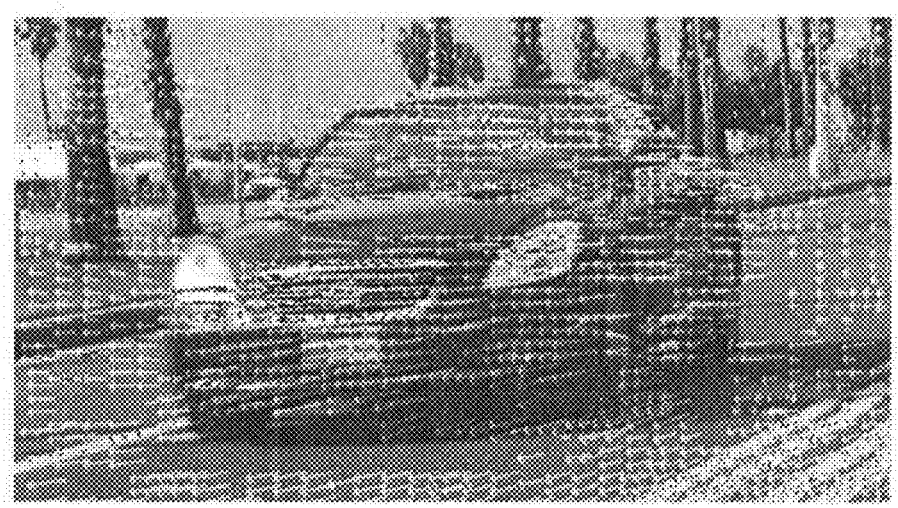
Figure 7C:
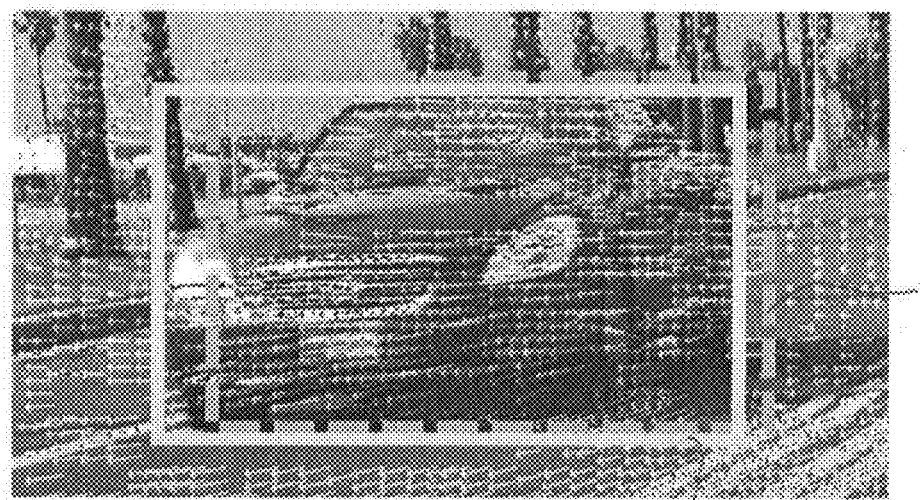

The Motion Vector Based Object Tracking process 22, discussed above, estimates the object detection result of the current frame using the motion vector extracted from the encoded video frames and the cached object detection result from the last offloaded frame. Motion vectors are broadly used by modern video encoding approaches (e.g. H.264 and H.265) to indicate the offset of pixels among frames to achieve a higher compression rate. Commodity mobile devices are usually equipped with specific hardware to accelerate video encoding and compute the motion vectors. FIGS. 7A-7C shows the key steps of the Motion Vector based Fast Object Tracking process. For each new frame captured by the camera, the system passes the frame to the Dynamic RoI Encoding process 20 discussed above. The encoder process 20 uses the frame corresponding to the last cached detection result (FIG. 7A) as its reference frame for inter-frame compression. After that, the system extracts all motion vectors from the encoded frame, as illustrated in FIG. 7B. To track the object in the current frame, the bounding box of this object in the last offloaded frame is used, the mean of all motion vectors that reside in the bounding box is calculated to find the shift the old position 60 to the current position 62, as illustrated in FIG. 7C. This process can also be applied to the human keypoint detection task, in which the mean motion vector in the closest 9×9 macroblock region of each keypoint is calculated, and used to shift each keypoint.

In experiment, it is found that the accuracy of the motion vector decreases as the time interval between the current frame and reference frame increases. However, due to the low offloading latency achieved by the proposed latency optimization process, this method can provide accurate object detection results with very short latency. The system is implemented on Nvidia Jetson TX2 requires only 2.24 ms for this motion tracking process, which leaves enough time and computation resources for the AR device to render high-quality virtual overlays within the 16.7 ms latency requirement. Note that this process cannot hide the latency to first detection of an object. Since this is already well under the response time that human observers notice, this process focuses on accurate tracking so that virtual objects can follow the motion of physical ones.

To effectively schedule the offloading pipeline, the Adaptive Offloading process 24, discussed above, is used to determine which encoded frame should be offloaded to the edge cloud. The Adaptive Offloading process 24 is designed based on two principles: (1) a frame will only be eligible to be offloaded if the previous offloaded frame has been completely received by the edge cloud 14; and (2) a frame will be considered for offloading if it differs significantly from the last offloaded frame. The first principle eliminates frames queuing up to avoid network congestion, while the second principle ensures that only necessary views with enough changes will be offloaded to minimize communication and computing costs. Therefore, if a frame satisfies both principles, it will be offloaded to the edge cloud.

The first principle requires the system to be aware of the transmission latency of previous offloaded frames. The edge cloud therefore signals the AR device once it receives the last slice of the offloaded frame. Based on this time difference between the reception time and the transmission time, the AR calculates the transmission latency and uses it to decide whether to offload the next encoded frame.

To fulfill the second principle, it is necessary to estimate the differences between two frames. Such differences can be evaluated from two perspectives with either of them satisfying the second principle: (1) whether large motions (including both user's motion and objects' motion) occur among the frames, (2) whether there are considerable amounts of changed pixels appearing in the frame. The motion of a frame is quantified by the sum of all the motion vectors, and the number of new pixels is estimated by the number of intra-predicted macroblocks within an encoded frame. Between the two types of macroblocks (inter-predicted block and intra-predicted block) within an encoded frame, it is experimentally found that intra-predicted macroblocks usually refer to newly appeared regions, since these macroblocks fail to find reference pixel blocks in the reference frame during encoding.

Various hardware and software components could be utilized to implement the system of the present disclosure. For example, a mobile development board (Nvidia Jetson TX2) could be used as the AR device, which contains the same mobile SoC (Tegra TX2) as the Magic Leap One AR glass. The Jetson board is connected to a TP-Link AC1900 router through a WiFi connection. An edge cloud is emulated with a PC equipped with an Intel i7-6850K CPU and a Nvidia Titan XP GPU, which connects to router through a 1 Gbps Ethernet cable. Both the AR device and the desktop PC run an Ubuntu 16.04 OS. The proposed process could be implemented using the following software packages: Nvidia JetPack, Nvidia Multimedia API, Nvidia TensorRT, and the Nvidia Video Codec SDK.

The client side functions could be implemented on the Nvidia Jetson TX2 with its JetPack SDK. The implementation follows the design flow in FIG. 3. A camera is used to capture session running at 60 fps using the JetPack Camera API, and register a video encoder as its frame consumer using the Multimedia API. To realize the RoI encoding module, the setROIParams( ) function is used to set the RoIs and their QP delta value for encoding the next frame, based on the RoIs generated on the edge cloud. The external RPS control mode is enabled to set the reference frame of each frame to the source frame of the current cached detection results, so that the extracted Motion Vectors can be used to shift the cached detection results. To implement the Parallel Streaming and Inference module, the slice mode for the video encoder is used with the setSliceLength( ) function with a proper length to let the encoder split a frame into four slices. After frame slices are encoded, the system extracts motion vectors and macroblock types from each slice using the getMetadata( ) function. This information is used as the input for Adaptive Offloading and MvOT in two different threads (Rendering thread and offloading thread). In the offloading thread, if the Adaptive Offloading module decides to offload this frame, its four slices will be sent out to the server through the wireless link one by one. In the rendering thread, the Motion Vector based Object Tracking module uses the extracted motion vectors and cached detection results to achieve fast object tracking. The system then renders virtual overlays based on the coordinates of the detection result.

The server side implementation contains two main modules: Parallel Decoding and Parallel Inference, which are designed to run in two different threads to avoid blocking each other. In the Parallel Decoding thread, the system keeps waiting for the encoded frame slices from the AR device. Once a slice is received, it immediately passes it to the video decoder for decoding in asynchronous mode, which won't block the system to continue receiving other slices. Nvidia Video Codec SDK is used to take advantage of the hardware accelerated video decoder in the Nvidia Titan Xp GPU. After each slice is decoded, the system passes it to the parallel inference thread in a callback function attached to the decoder. The Parallel Inference module is implemented using the Nvidia TensorRT, which is a high-performance deep learning inference optimizer designed for Nvidia GPUs. To push the limit of inference latency on the server side PC, the INT8 calibration tool is used in TensorRT to optimize the object detection model, and achieves 3-4 times latency improvement on the same setup. To achieve the proposed Dependency Aware Inference method, a Plugin-Layer is added before each convolutional layer and pooling layer to adjust their input and output regions based on Equation 2. After the inference process of a whole frame, the edge cloud sends the detection results as well as the QP map back to the AR device for future processing.

The performance of the system can be evaluated in terms of detection accuracy, detection latency, end-to-end tracking and rendering latency, offloading latency, bandwidth consumption, and resource consumption. The results demonstrate that the system is able to achieve both the high accuracy and the low latency requirement for AR headsets and hand-held AR system running at 60 fps, under different network background traffic loads. The result shows that the system increases the detection accuracy by 20.2%-34.8%, and reduce the false detection rate by 27.0%-38.2% for the object detection and human keypoint detection tasks, respectively. To achieve this high accuracy, the system reduces the offloading latency by 32.4%-50.1% and requires only an average of 2.24 ms to run the MvOT method on the AR device, which leaves the remaining time between frames to render high quality virtual elements.

Figure 9A:
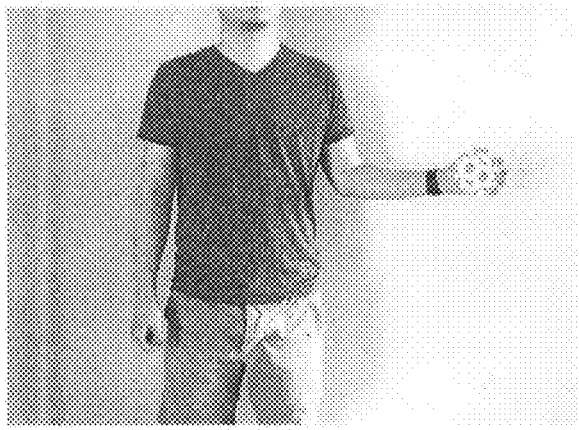
FIGS. 9A-9C are images illustrating rendering results generated by the system of the present disclosure.
Figure 9B:
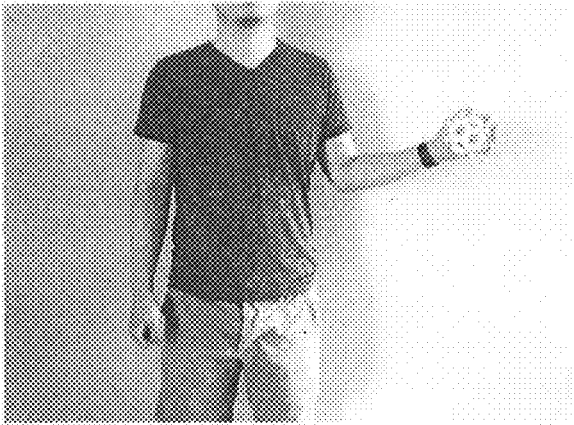
Figure 9C:
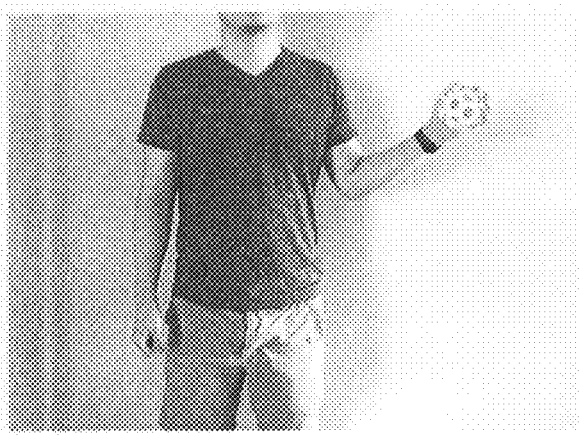
Figure 9D:
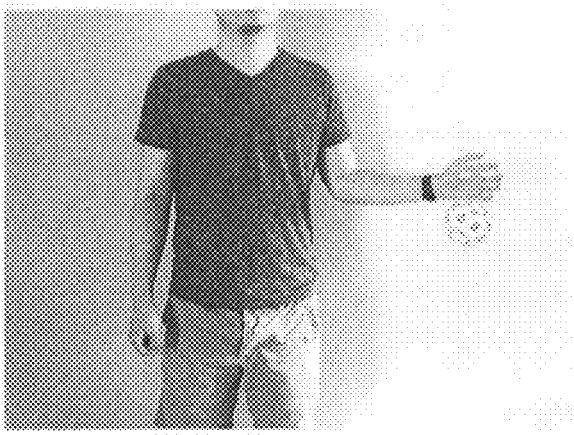
FIGS. 9D-9F are images illustrating rendering results generated by a baseline approach.
Figure 9E:
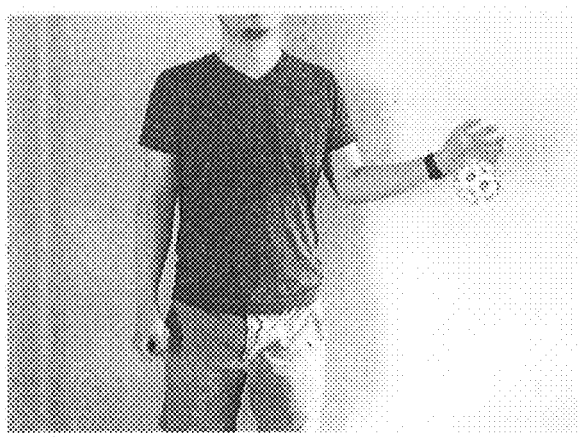
Figure 9F:
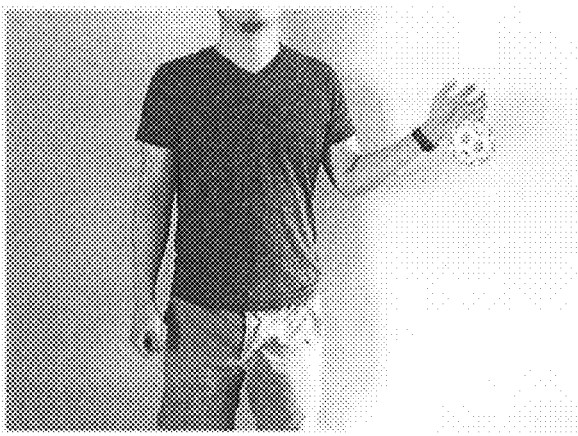

Two different detection tasks were performed to evaluate the performance of the system: an object detection task and a keypoint detection task. Both of them follow the flow in FIG. 3. In the first task, the edge cloud runs a Faster R-CNN object detection model with ResNet-50 to generate bounding boxes of objects for each offloaded frame. In the second task, the edge cloud runs a Keypoint Detection Mask R-CNN model with ResNet-50 to detect the human body keypoints. Based on the detection result, the AR device renders a complex 3D cube on the user's left hand, as shown in FIGS. 9A-9C. Both detection tasks run local object tracking and rending at 60 fps on the AR device. Two different WiFi connections (2.4 GHz and 5 GHz) are used as the wireless link between the AR device and the edge cloud. The bandwidths measured with iperf3 are 82.8 Mbps and 276 Mbps correspondingly. Compared to the first task, the second task incurs higher rendering loads on the AR device. Baseline test results are illustrated in FIGS. 9D-9F.

For repeatable experiments, raw YUV frames are extracted at 1280×720 resolution from ten videos in the Xiph video dataset as the camera input for evaluation. DrivingPOV, RollerCoaster, BarScene, FoodMarket, and SquareAndTimelapse for object detection task. Crosswalk, BoxPractice, Narrator, FoodMarket, as well as SquareAndTimelapse for the human keypoint detection task. In total, 5651 frames have been processed in evaluation. Pre-recorded videos have been used instead of the raw camera feed because the pre-recorded video frames usually contains complex scenes with multiple objects and different camera motions, which are much more challenging than normal camera feed. The experiments strictly follow the same work flow as shown in FIG. 3 running in real-time, without any pre-encoding or profiling on each frame.

The system is able to achieve high detection accuracy and low false detection rate under various network conditions. The object detection accuracy is measured in four approaches: the baseline solution (Baseline), the solution with only the two latency optimization process (DRE+PSI), the solution with only the client side motion vector based object tracking method (Baseline+MvOT), and the overall system with all three process (DRE+PSI+MvOT). The baseline approach follows the standard pipeline introduced in Section 2. The detection accuracy is evaluated with two key metrics: mean detection accuracy and false detection rate. Specifically, extracted frames of each video are fed to the client side video encoder at 60 fps to emulate a camera but allow experiments with repeatable motion in the video frames. To calculate the detection accuracy for each frame, the mean Intersection over Union (IoU) or Object Keypoint Similarity (OKS) between the detection result from the MvOT and the ground truth detection result of each frame are calculated (without frame compression and emulating no latency). Recall that IoU is 0 when the detected object labels do not match (e.g., vehicle vs pedestrian) and otherwise represent the degree of position similarity within the frame. More precisely, it is the intersection area over the union area of the detection bounding box and ground truth bounding box. Similar to IoU, OKS also varies from 0 to 1, describing the normalized Euclidean distances between detected positions of keypoints and groundtruth labels. In the experiment, the server and the client devices are connected through two WiFi connections: WiFi-2.4 GHz and WiFi-5 GHz.

TABLE 1

Mean Detection Accuracy (IoU/OKS) of two models with two WiFi connections.

| Detection Model | Approaches | WiFi 2.4 GHz | WiFi 5 GHz |
| --- | --- | --- | --- |
| Faster R-CNN Object Detection | Baseline | 0.700 | 0.758 |
| | DRE + PSI | 0.758 | 0.837 |
| | MvOT only | 0.825 | 0.864 |
| | Overall System | 0.864 | 0.911 |
| Mask R-CNN Keypoint Detection | Baseline | 0.6247 | 0.6964 |
| | DRE + PSI | 0.7232 | 0.7761 |
| | MvOT only | 0.7667 | 0.8146 |
| | Overall System | 0.8418 | 0.8677 |

Table 1 shows the mean detection accuracy of two models with two different WiFi connections. In the object detection case, it is observed that the system achieves a 23.4% improvement for the WiFi-2.4 GHz connection and a 20.2% improvement for the WiFi-5 GHz connection. In the human keypoint detection case, the system achieves a 34.8% improvement for WiFi-2.4 GHz and a 24.6% improvement for WiFi-5 GHz. The results also show that the three main process (DRE, PSI, and MvOT) are able to effectively increase the detection accuracy of the system. By comparing the DRE+PSI approach with the Baseline approach, it is found that the low latency offloading solution helps to achieve high detection accuracy. By comparing the Baseline+MvOT with the Baseline approach, it is seen that the fast object tracking process increases accuracy. The gains of these two approaches accumulate in the overall system accuracy.

In addition, the CDF of the measured detection accuracy results is shown in FIGS. 8A-8D. To determine acceptable detection accuracy, two widely used thresholds in the computer vision community are used: 0.5 as a loose accuracy threshold and 0.75 as the strict accuracy threshold. A detected bounding box or a set of keypoints with a detection accuracy less than the accuracy metric is then considered a false detection. Due to the high quality requirement of AR/MR system, the false detection rate is mainly discussed in terms of the strict accuracy metric, but the loose metric is also marked in each figure with the black dashed line.

Figure 8A:
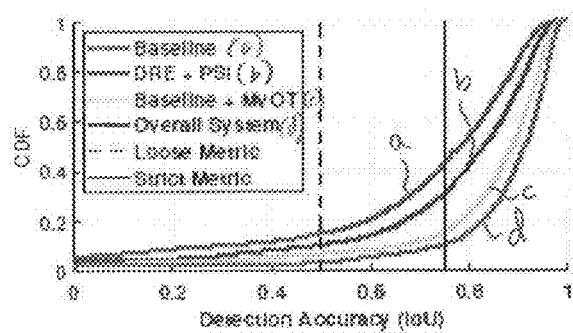
FIGS. 8A-8D are graphs illustrating detection accuracy (IoU/OKS) for object detection and keypoint detection tasks performed by the system of the present disclosure.
Figure 8B:
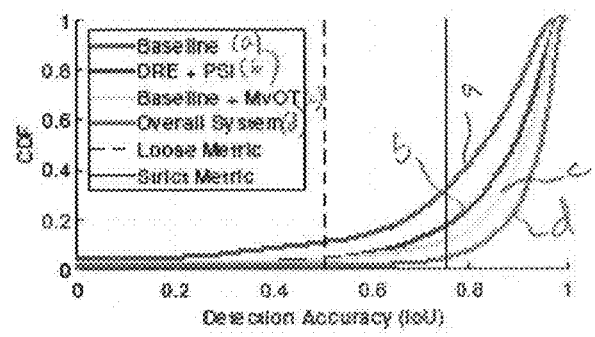
Figure 8C:
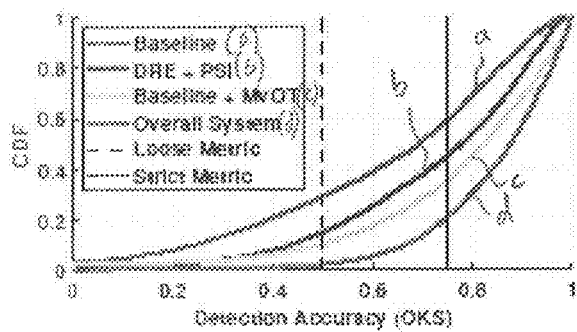
Figure 8D:
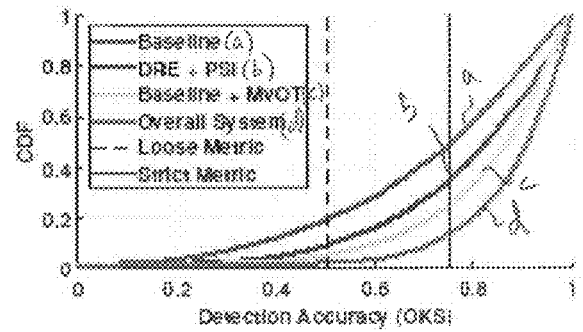

FIGS. 8A-8B show the CDF of IoU for the object detection task. Result shows that the system only has 10.68% false detection rate using WiFi-2.4 GHz and 4.34% using WiFi-5 GHz, which reduce the false detection rate of the baseline approach by 33.1% and 27.0% correspondingly. FIGS. 8C-8D show the CDF of OKS for the human keypoint detection task. Compared to object detection task that only tracks the position of each object bounding box, this task requires to track 17 human keypoints of each human using embedded motion vector, which is much more challenging. However, the system can still reduce the false detection rate by 38.2% with WiFi-2.4 GHz and 34.9% with WiFi-5 GHz.

To understand how the detection accuracy affects the AR experience, several frames with their detection accuracy (OKS) from a sample AR the human keypoint detection task are shown in FIG. 9. In this sequence, the person is moving the left hand while the system seeks to render virtual object in the palm of the hand. The three frames in the first row are the rendering results based on the system, while the bottom three frames are based on the baseline approach. It can be observed that the rendered cube is well-positioned in the system but trailing behind the palm due to delayed detection results in the baseline approach.

Figure 10:
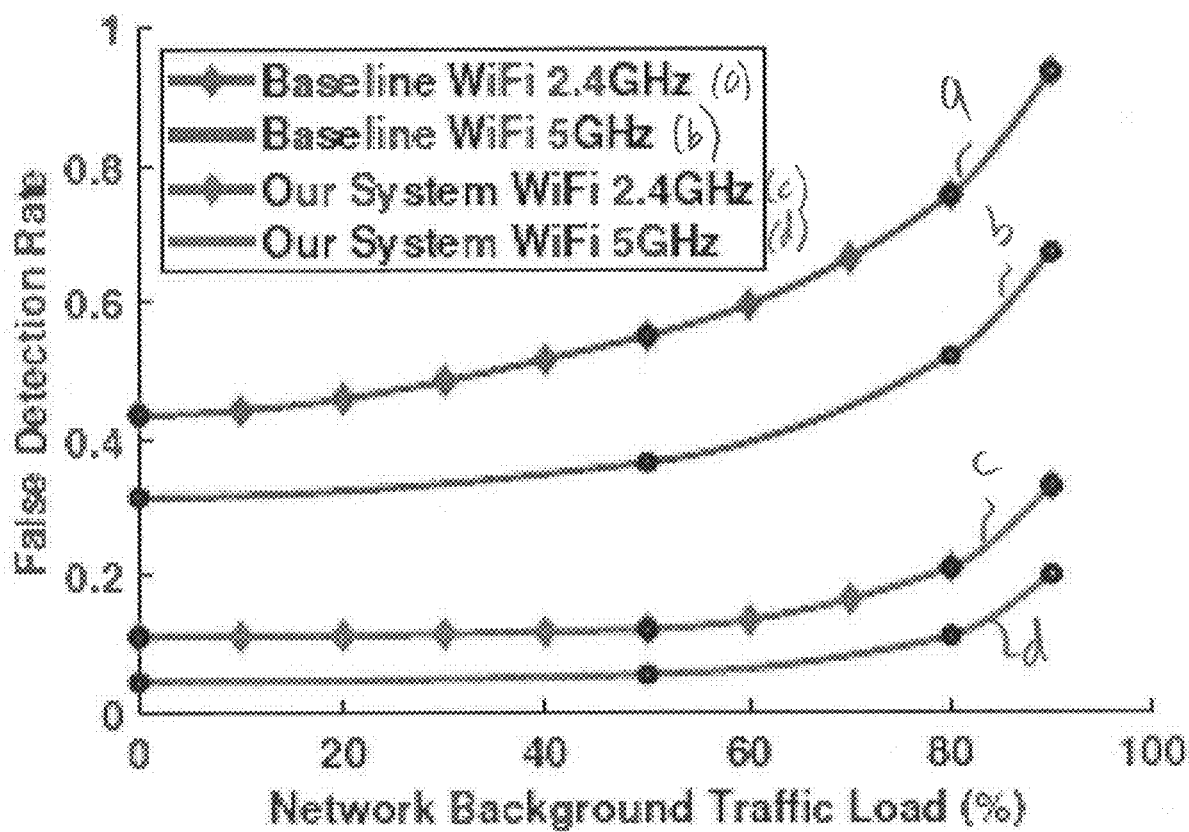
FIG. 10 is a graph illustrating false detection rates of the system.

Results further show that the system is less affected by the background network load, and accuracy degrades more gracefully even in congested networks. FIG. 10 shows the measurement results of the false detection rate in WiFi networks with different background traffic loads. In the experiment, the background traffic in the network is gradually increased, and record the corresponding false detection rate with both WiFi-5 GHz and WiFi-2.4 Hz connections. When raising the traffic load from 0% to 90%, the false detection rate for baseline increases by 49.84% and 35.60% in WiFi-2.4 GHz and WiFi-5 GHz, respectively. For the system, the increase is only 21.97% and 15.58%, which shows the higher tolerance of the system to network congestion.

Figure 11:
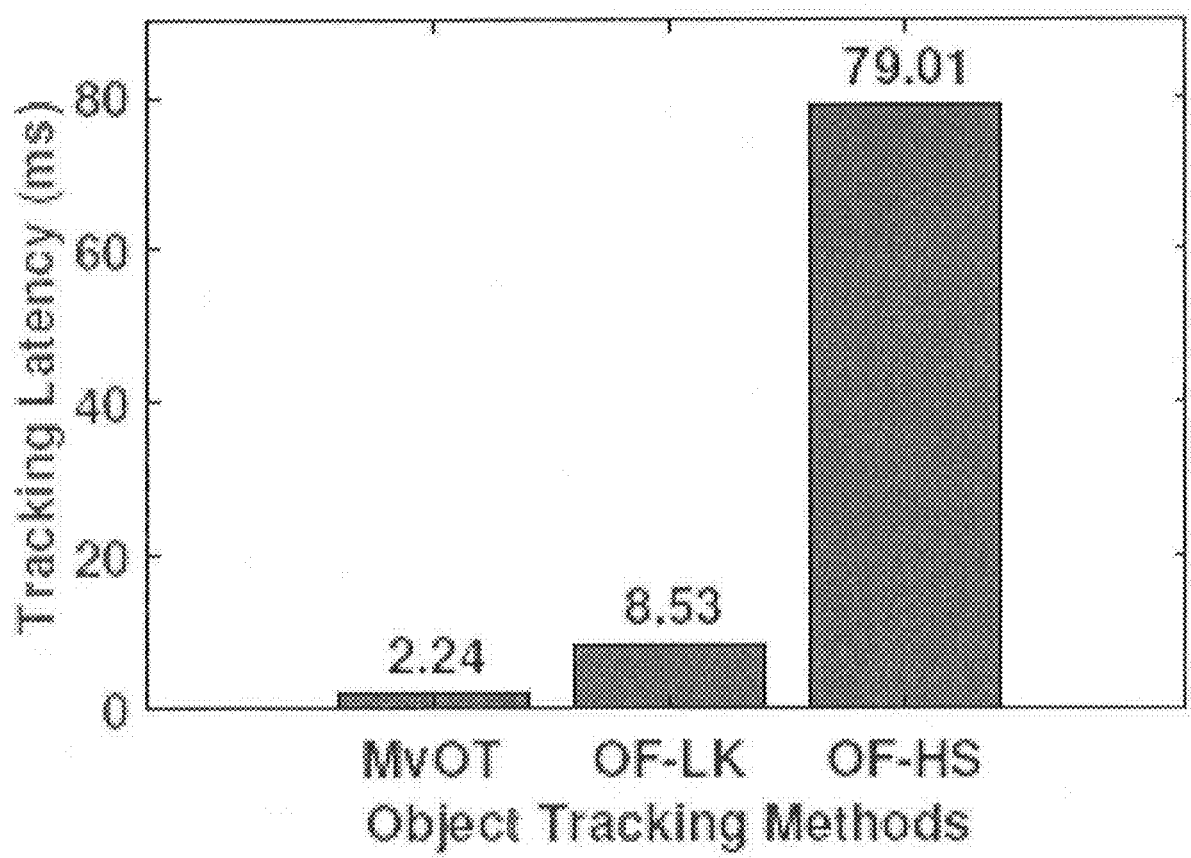
FIG. 11 is a graph illustrating the latency of MvOT compared with two different optical flow tracking methods.

The system only requires 2.24 ms to adjust the positions of previously detected objects in a new frame, which leaves enough time and computation resources for the AR device to render high-quality virtual overlays with the time between two frames. FIG. 11 compares the MvOT method with two standard optical flow based object tracking approaches—the Lucas Kanade and Horn Schunck methods. Both methods have been optimized to take advantage of the on-board GPU of Nvidia Jetson TX2. It can be observed that the 2.24 ms MvOT method is significantly faster than traditional optical flow approaches and requires 75% less GPU resources compared to the Lucas Kanade based optical flow method. While their tracking may be more accurate, the delay would mean missing the frame display time, which leads to lower accuracy because objects can have moved even further in the next frame.

Figure 12:
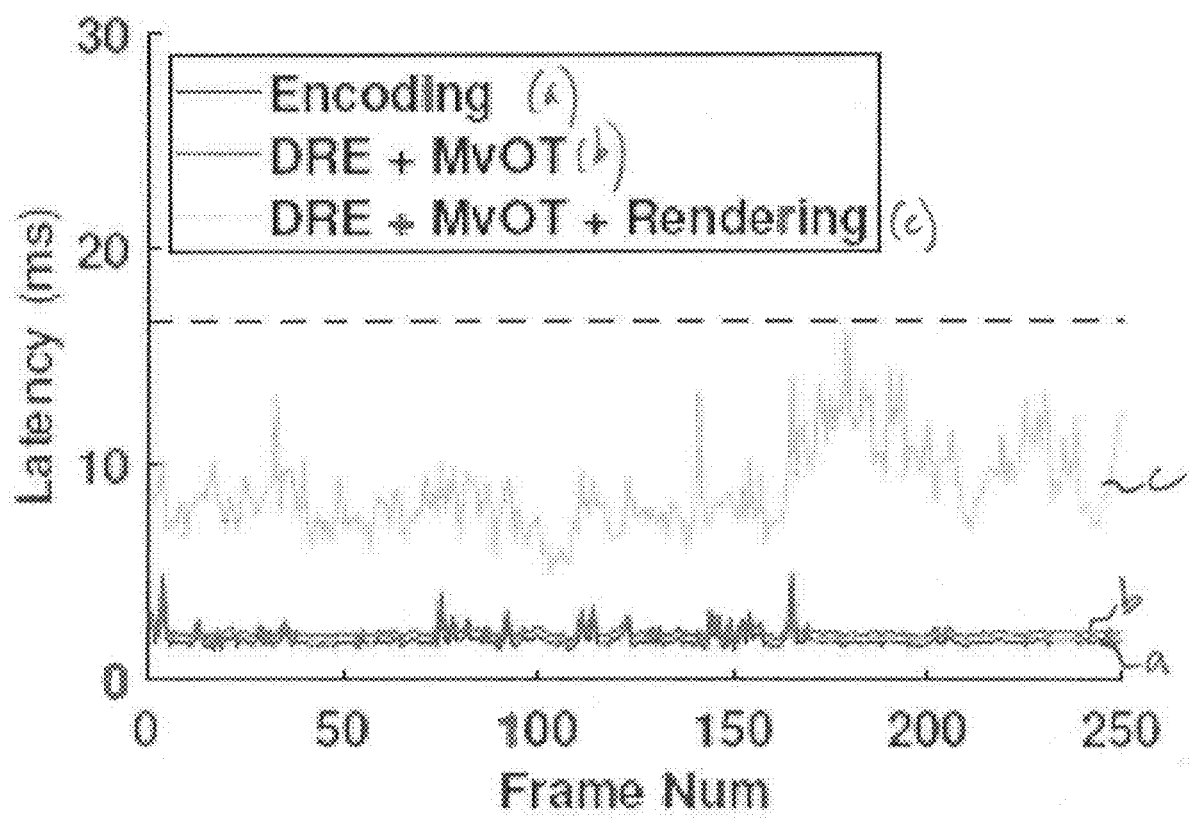
FIG. 12 is a graph illustrating the raw latency traces of the system running a keypoint detection task.

The system is able to achieve an end-to-end latency within the 16.7 ms inter-frame time at 60 fps to maintain a smooth AR experience. To validate this, the keypoint detection task is run with 3D cube rendering on the BoxingPractice video and plot the raw latency traces in FIG. 12. The black dashed line in the figure is the 16.7 ms deadline for 60 fps AR devices, and the yellow curve is the end-to-end latency of this application. Due to the low latency object detection method (Encoding+MvOT) requires an average latency of only 2.24 ms, leaves more than 14 ms for the AR device to render high quality elements on the screen. It has been found that the system is able to finish the detection and rendering tasks within 16.7 ms for all 250 test frames.

Figure 13:
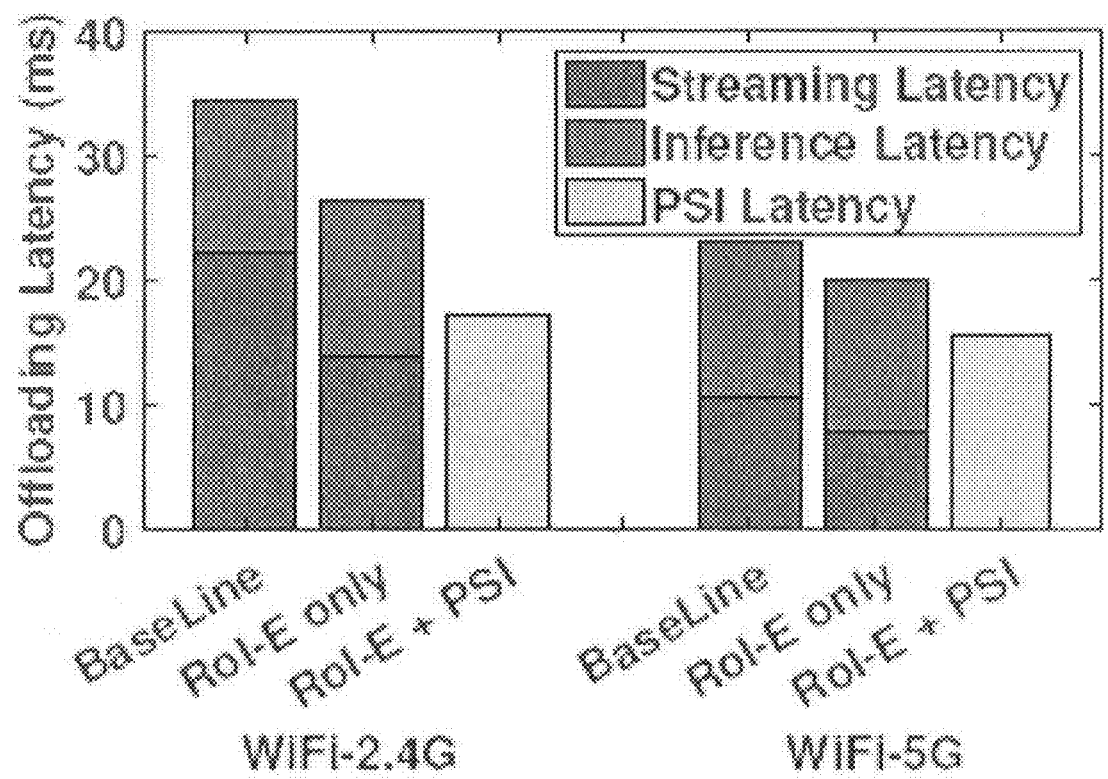
FIG. 13 is a graph illustrating offloading latency of three approaches using WiFi.

The RoI Encoding and Parallel Streaming and Inference process can effectively reduce the offloading latency. FIG. 13 shows the offloading latency of three methods (Baseline, DRE, and DRE+PSI) with two different WiFi connections. The offloading latency is divided into streaming latency and inference latency for the first two methods, and a PSI latency is used for the third method, because the streaming and inference processes run in parallel. The streaming latency contains time spending on encoding, transmission, and decoding tasks. The mean encoding latency to encode an HD frame on Jetson TX2 is 1.6 ms and the mean decoding latency on the edge cloud server is less than 1 ms.

In the baseline approach, the mean offloading latency is 34.56 ms for WiFi-2.4G and 22.96 ms for WiFi-5G. With the RDE process, the system is able to reduce the streaming latency by 8.33 ms and 2.94 ms, respectively. Combining the process of both RDE and PSI, the system further reduces the offloading latency to 17.23 ms and 15.52 ms. It has been found that the latency optimization process are especially effective to reduce the offloading latency on lower bandwidth connections, such as on the 2.4 GHz WiFi network.

The system is able to reduce the bandwidth consumption of the offloading task through the Dynamic RoI Encoding (DRE) and Adaptive Offloading process. An experiment to measure the bandwidth consumption of three different offloading approaches (Baseline, DRE only, and DRE plus Adaptive Offloading) in the object detection task was conducted. In all three approaches, seven different QPs (5, 10, 15, 20, 25, 30, and 35) were used to control the base quality to encode each frame. The approaches with the RoI Encoding process will adjust the encoding quality based on the detected RoIs, and the adaptive offloading approach further makes the decision whether to offload each frame to the edge cloud. The mean detection accuracy was recorded and the bandwidth consumption of these approaches for each QP.

Figure 14:
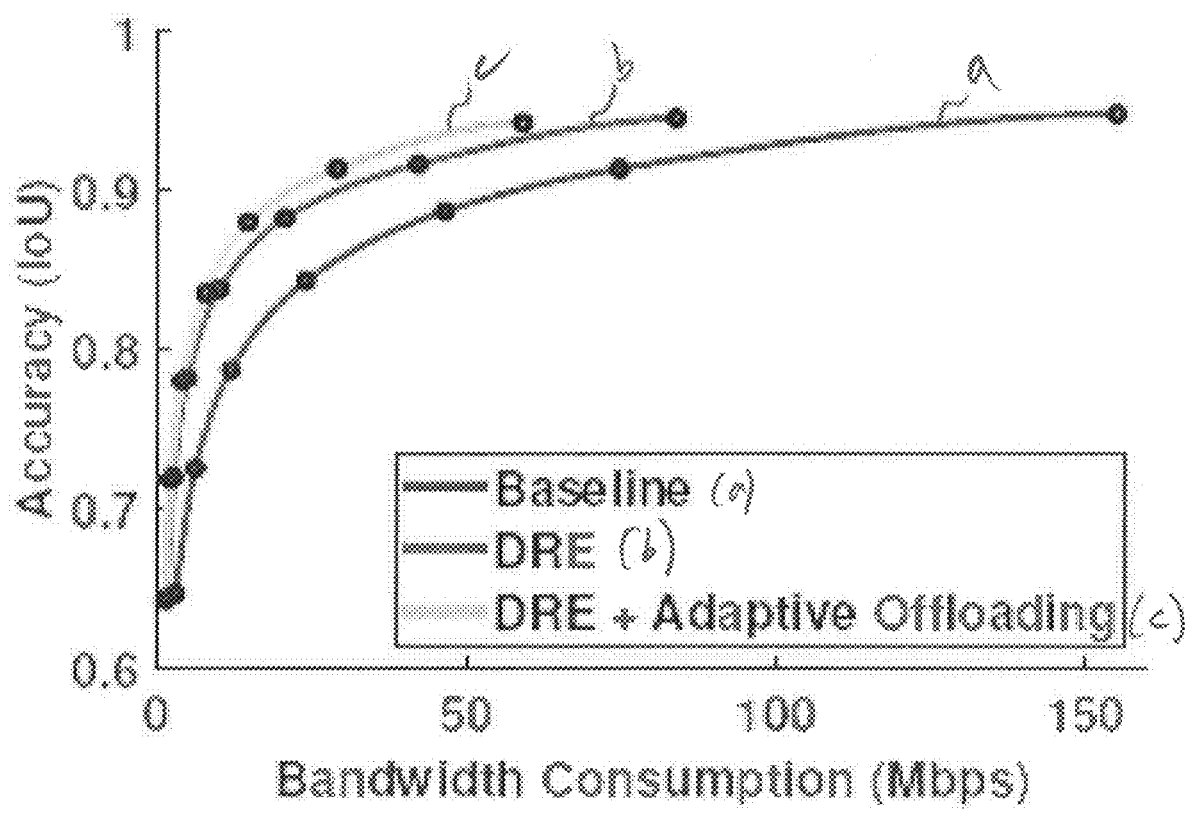
FIG. 14 is a graph illustrating bandwidth consumption of three approaches.

FIG. 14 shows how the mean detection accuracy changes with the bandwidth consumption for the object detection task, with the comparison of these three approaches. For the same bandwidth consumption, the RoI Encoding plus Adaptive Offloading approach can achieve the highest mean detection accuracy. Similarly, it can be observed that this approach also requires the least bandwidth consumption given a mean detection accuracy, e.g. to achieve the mean detection accuracy of 0.9, the system reduces 62.9% bandwidth consumption compared to the baseline approach.

Figure 15:
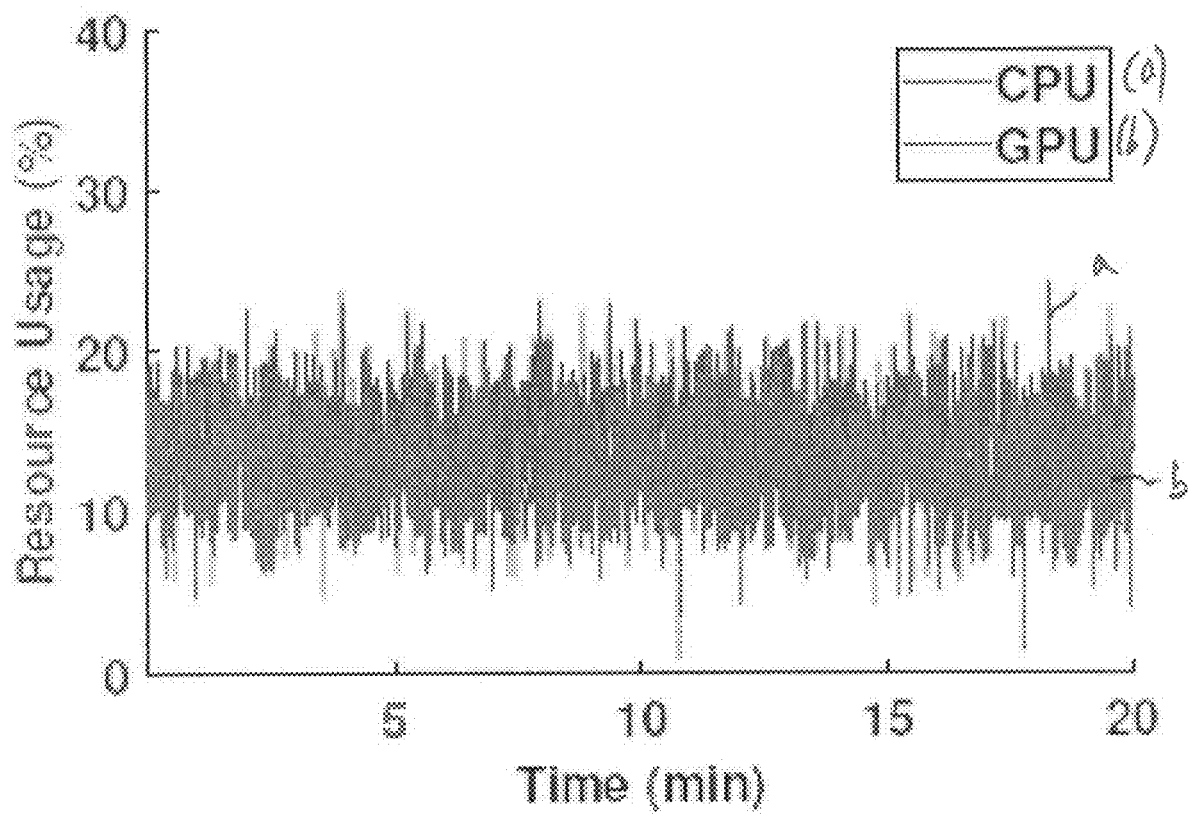
FIG. 15 is a graph illustrating CPU/GPU resource consumption of the system.

The solution consumes very few computation resources on the AR devices. To calculate the resource consumption of the system, an object detection task was run without any local rendering tasks on the DrivingPOV video repeatedly for 20 minutes and use the tegrastats tool from JetPack to measure the resource CPU and GPU usage. FIG. 15 shows the raw resource usage traces for 20 minutes. Results show that the system requires only 15% of the CPU resource and 13% of the GPU resource, which leaves all the remaining resources to rendering rich graphic overlays for AR/MR system.

The present system can be extended to different hardware and operating systems. The video streaming modules on both the server side and client side can be implemented using various hardware codec APIs, such as Nvidia Video Codec, Intel QuickSync, Android MediaCodec, etc. The inference module on the edge cloud is developed using Nvidia TensorRT platform, which is compatible with most servers equipped with Nvidia GPUs. As shown in FIG. 11, the system better tolerates higher background network traffic

What is claimed is:

1. A system for edge assisted real-time object detection for mobile augmented reality, comprising:
    an AR device having a processor, the processor of the AR device capturing at least one image frame and dynamically encoding a region of interest in the at least one image frame; and
    an edge cloud computing device in communication with the AR device,
    wherein the AR device adaptively offloads the region of interest to the edge cloud computing device, and wherein the edge cloud computing device performs image recognition in the region of interest and transmits results of the image recognition to the AR device, and
    wherein the AR device processes the at least one image frame using a motion vector-based object tracking process.

2. The system of claim 1, wherein the edge cloud computing device detects an object in the region of interest and transmits the detected object to the AR device, and the AR device renders the detected object and the at least one image frame.

3. The system of claim 1, wherein the AR device transmits the at least one image frame to the edge cloud device in portions, the edge cloud computing device processing the portions.

4. The system of claim 3, wherein the AR device streams the portions of the at least one image in parallel to the edge cloud computing device.

5. The system of claim 3, wherein the edge cloud computing device processes the portions of the at least one image in parallel.

6. The system of claim 1, wherein the edge cloud device detects the object in the region of interest using a neural network.

7. The system of claim 1, wherein the AR device stores the detected object in a cache.

8. The system of claim 1, wherein the AR device compresses at least part of the region of interest prior to offloading the region of interest to the edge cloud computing device.

9. The system of claim 1, wherein dynamic encoding of the region of interest by the AR device reduces transmission latency and bandwidth consumption when the region of interest is offloaded to the edge cloud computing device.

10. A method for edge assisted real-time object detection for mobile augmented reality, comprising the steps of:
    capturing at least one image frame at an AR device;
    dynamically encoding a region of interest in the at least one image frame at the AR device;
    adaptively offloading the region of interest to an edge cloud computing device;
    performing image recognition in the region of interest at the edge cloud computing device;
    transmitting results of the image recognition to the AR device; and
    processing the at least one image frame at the AR device using a motion vector-based object tracking process.

11. The method of claim 10, further comprising detecting an object in the region of interest, transmitting the detected object to the AR device, and rendering the detected object and the at least one image frame.

12. The method of claim 10, further comprising transmitting the at least one image frame from the AR device to the edge cloud device in portions, the edge cloud device processing the portions of the at least one image.

13. The method of claim 12, further comprising streaming the portions of the at least one image frame from the AR device to the edge cloud device in parallel.

14. The method of claim 12, further comprising processing the portions of the at least one image frame at the edge cloud device in parallel.

15. The method of claim 10, further comprising detecting the object in the region of interest using a neural network.

16. The method of claim 10, further comprising storing the detected object in a cache in the AR device.

17. The method of claim 10, further comprising compressing at least part of the region of interest prior to offloading the region of interest to the edge cloud computing device.

18. The method of claim 10, wherein the step of dynamically encoding of the region of interest reduces transmission latency and bandwidth consumption when the region of interest is offloaded to the edge cloud computing device.

19. A method for edge assisted real-time object detection for mobile augmented reality, comprising the steps of:
    capturing at least one image frame at an AR device;
    transmitting the at least one image frame to an edge cloud computing device in portions sent in parallel to the edge cloud computing device;
    performing image recognition on the at least one image frame at the edge cloud computing device;
    transmitting results of the image recognition to the AR device; and
    processing the at least one image frame at the AR device using a motion vector-based object tracking process.

20. The method of claim 19, further comprising detecting an object in at least one image frame, transmitting the detected object to the AR device, and rendering the detected object and the at least one image frame.

21. The method of claim 19, further comprising detecting the object using a neural network.

22. The method of claim 19, further comprising storing the detected object in a cache in the AR device.

23. The method of claim 19, further comprising compressing at least a portion of the at least one image frame prior to transmitting the at least one image frame to the edge cloud computing device.

* * * * *